J. HUDRY.
CHILD'S VEHICLE.
APPLICATION FILED SEPT. 13, 1915.

1,218,943.

Patented Mar. 13, 1917.
8 SHEETS—SHEET 1.

Inventor
John Hudry
by E. A. Fincke
his Attorney

J. HUDRY.
CHILD'S VEHICLE.
APPLICATION FILED SEPT. 13, 1915.

1,218,943.

Patented Mar. 13, 1917
8 SHEETS—SHEET 2.

Inventor
John Hudry,
by E. A. Fincel
his Attorney

Inventor
John Hudry
by E. A. Fincke
his Attorney

J. HUDRY.
CHILD'S VEHICLE.
APPLICATION FILED SEPT. 13, 1915.

1,218,943.

Patented Mar. 13, 1917.
8 SHEETS—SHEET 4.

Inventor
John Hudry.
by E. A. Finerel
his Attorney

J. HUDRY.
CHILD'S VEHICLE.
APPLICATION FILED SEPT. 13, 1915.

1,218,943.

Patented Mar. 13, 1917.
8 SHEETS—SHEET 5.

Inventor
John Hudry,
by
his Attorney

J. HUDRY.
CHILD'S VEHICLE.
APPLICATION FILED SEPT. 13, 1915.

1,218,943.

Patented Mar. 13, 1917.
8 SHEETS—SHEET 6.

J. HUDRY.
CHILD'S VEHICLE.
APPLICATION FILED SEPT. 13, 1915.

1,218,943.

Patented Mar. 13, 1917.
8 SHEETS—SHEET 7.

UNITED STATES PATENT OFFICE.

JOHN HUDRY, OF HAZLETON, PENNSYLVANIA.

CHILD'S VEHICLE.

1,218,943.  Specification of Letters Patent.  Patented Mar. 13, 1917.

Application filed September 13, 1915. Serial No. 50,419.

*To all whom it may concern:*

Be it known that I, JOHN HUDRY, a citizen of the United States, residing at Hazleton, in the county of Luzerne and State of Pennsylvania, have invented a certain new and useful Improvement in Children's Vehicles, of which the following is a full, clear, and exact description.

This invention relates to children's vehicles, and the object of the invention is to provide a vehicle for children, including a velocipede and a go-cart, the two being so combined that the vehicle may be used as a velocipede by a single child, as a combination velocipede and go-cart, so that the child on the velocipede may propel the vehicle and carry another child occupying the go-cart, or the go-cart may be utilized for carrying other articles, such as bundles, packages, &c.; or, the front fork of the vehicle and its attached steering and propelling wheel and the handle bar may readily be removed and the rear part of the vehicle used as an ordinary go-cart for pushing or pulling a child therein.

A further object of the invention is to provide a combination velocipede and go-cart as above described with suitable driving mechanism for the go-cart, whereby both occupants of the vehicle may assist in propelling the vehicle.

A further object of the invention is to provide such a combination velocipede and go-cart which may be folded into small compass for storage and transportation purposes.

The invention consists in a combined velocipede and go-cart, and in the details of construction thereof, all substantially as I will proceed now to more particularly set forth and finally claim.

In the accompanying drawings illustrating the invention, in the several figures of which like parts are similarly designated.

Figure 1:
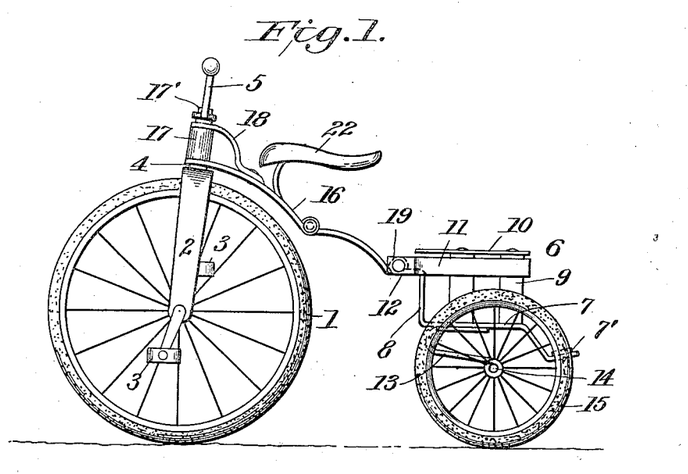
Figure 1 is a side elevation of one form of the vehicle, and Fig. 2 a plan view thereof.
Figure 2:
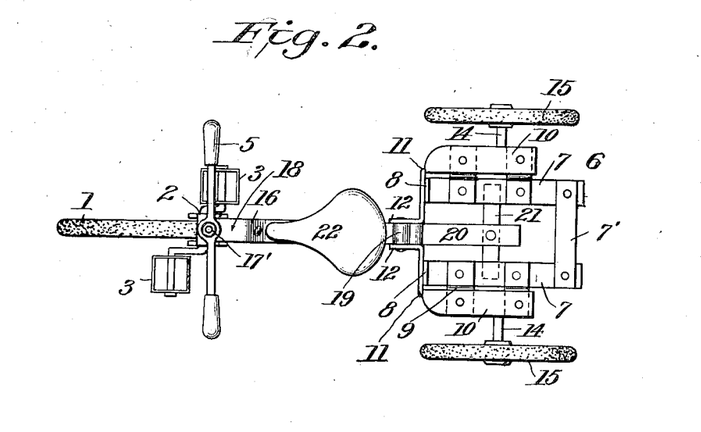

As shown in Figs. 1 and 2, the vehicle comprises the front wheel 1 mounted in the fork 2 of any usual or approved construction and provided with the pedals 3 and steering post 4 and handle bar 5.

6, is the go-cart, the body of which is constructed of a series of strips of sheet metal or other suitable material, and comprises the spaced side bars 7 bent upwardly to form the front members 8, upright side members 9 having the arm rests 10 secured to their upper ends, and upper connecting members 11 extending around the front and terminating in ears 12 to form part of a hinge joint for the backbone for hingedly connecting the go-cart with the front steering and propelling wheel. The rear ends of the lower side bars 7 are extended rearwardly and downwardly and connected by a foot rest 7'. The parts are riveted or otherwise secured together and thus form the body or seat of the go-cart.

13 are springs secured to the lower side bars 7 of the go-cart body and provided with stub-axles 14 to receive the supporting wheels 15 for the go-cart.

16 is the backbone for connecting the steering and propelling wheel with the go-cart, and at its forward end is provided with a hollow head 17 to receive the steering post 4 and handle bar 5, and these parts are detachably locked by a nut 17', and said head 17 is fixed between the backbone and a bracket 18 secured to the upper side of the backbone, and serves as a handle for the go-cart when it is desired to use the go-cart alone, and the steering wheel, fork and handle bar are detached therefrom.

The backbone 16 is hingedly connected, as at 19, to the ears 12 of the body of the go-cart, and is then extended downwardly and rearwardly between the lower members 7 of the body of the go-cart, as at 20 Fig. 2, and provided with a pivoted cross-piece 21 adapted to engage the under sides of the bars 7 to lock the parts in position of use.

22 is the seat which may be secured to the backbone in any suitable manner.

It will be observed that by simply turning the cross-piece 21 to disengage it from the side bars 7 the backbone may be turned upon its hinge to bring the steering wheel 1 downward and backward under the go-cart, the front wheel 1 passing between the side bars 7, and thereby folding the vehicle into a compact form for storage and transportation.

When the parts are arranged and connected as thus described, it is obvious that one child may sit upon the seat 22 and propel the vehicle alone, or another child may occupy the go-cart and be propelled or drawn by the rider of the velocipede; or if it be desired to use the go-cart alone, it is only necessary to unscrew the nut 17' and remove the handle bar and fork and its attached wheel, and the go-cart may be used alone for hauling a child by grasping the handle 17 and pushing or pulling the cart in the usual manner.

Figure 3:
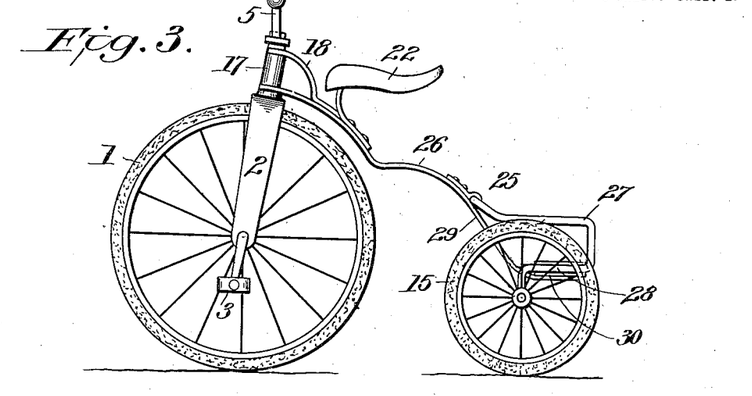
Fig. 3 is an elevation of another form of vehicle embodying the invention and showing a modified form of go-cart body.
Figure 4:
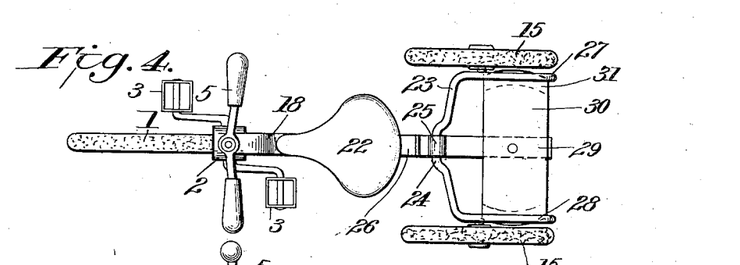
Fig. 4 is a plan view thereof.

As shown in Figs. 3 and 4, the body of the go-cart may be constructed of wire and bent to form a front bar 23 having an offset portion 24 to receive the hinge 25 of the backbone 26, and then bent rearwardly and downwardly to form the side members 27 and then forwardly to form the wheel supports 28, and in this form of the device, the backbone 26 is provided with the extension 29 to which is pivoted a cross-bar 30 having notched ends 31 adapted to engage the wheel supporting members 28 of the go-cart frame, to lock the parts in operative position, the said bar 30 constituting a seat for the go-cart.

Figure 5:
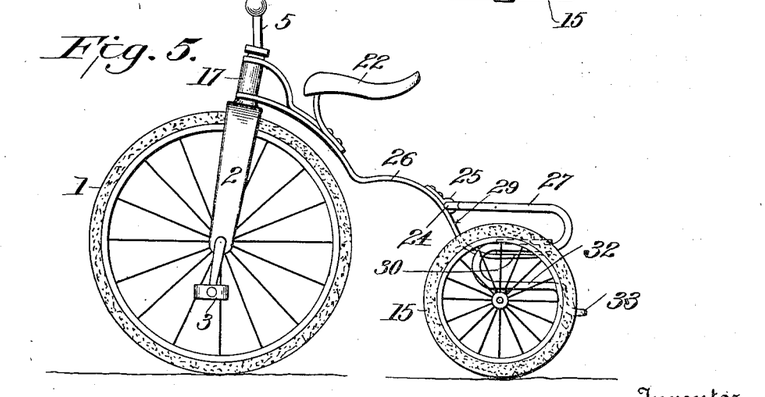
Fig. 5 is an elevation showing another modified form of go-cart body.

Fig. 5 shows a construction of go-cart frame somewhat similar to that shown in Figs. 3 and 4, but in this form of the device, the wire forming the go-cart frame instead of terminating in axle nibs or supports for the wheels is carried rearwardly, as at 32, and bent downwardly to form a foot rest 33. The wheels are secured to the rearward extensions 32 in any suitable manner, the extensions 32 forming a spring support for the wheels.

In all of the above figures the go-carts are shown as rearwardly facing vehicles.

Figure 6:
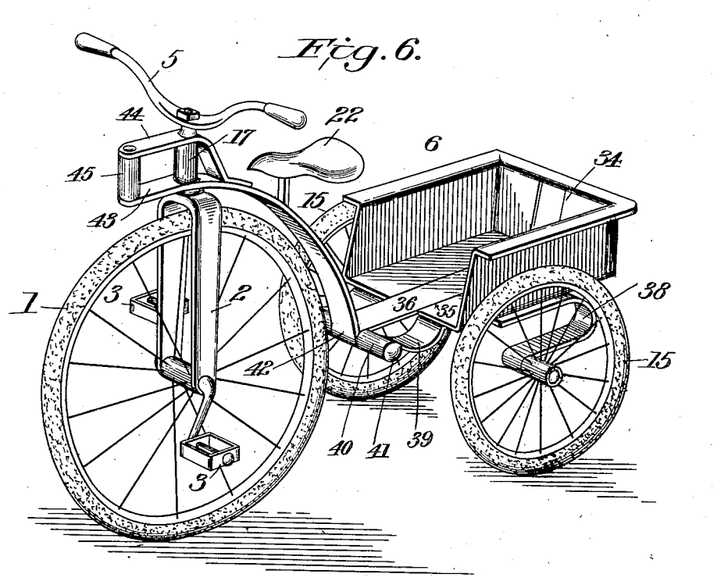
Fig. 6 is a perspective view of another form of vehicle embodying the invention, and showing a modified form of go-cart body with a front seating arrangement and a modified form of handle for the go-cart.
Figure 7:
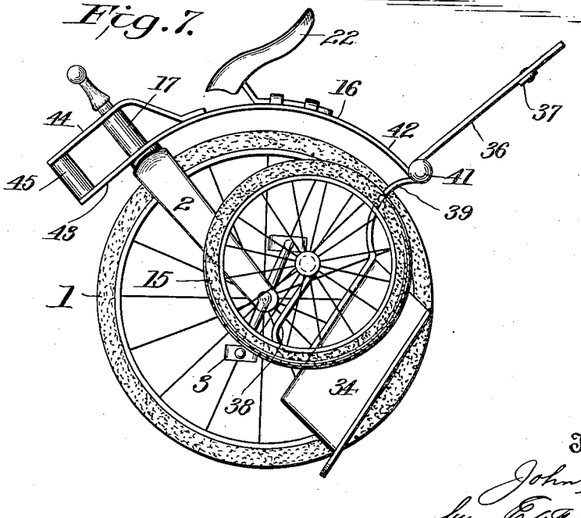
Fig. 7 is an elevation showing the vehicle of Fig. 6 in folded position.

In Figs. 6 and 7, the go-cart body is shown as a front facing vehicle, and in this form of the device, the body 34 is formed of sheet metal and the bottom or seat portion provided with a longitudinal slot or opening 35 to receive the backbone extension 36, which, as in the other forms, is provided with the pivoted cross-piece 37 to engage the bottom of the body to lock the parts in position. The body is also provided with springs 38 for supporting the wheels. The front of the body is provided with the spaced forward and curved extensions 39 terminating in eyes 40 to receive the hinge pintle 41 passing through said eyes and the hinge member 42 of the backbone for pivotally connecting the backbone and body, so that the steering wheel or velocipede attachment may be folded downwardly and upwardly within the body of the go-cart, as shown in Fig. 7.

In said Figs. 6 and 7, is also shown a modified form of handle for manipulating the go-cart when the steering wheel and its appurtenances are removed, and said handle is formed by extensions of the backbone and bracket, as at 43 and 44, respectively, beyond the steering head 17, and an interposed gripping sleeve or handle 45.

Furthermore, in the arrangement shown in said Figs. 6 and 7, the forward extensions 39 and their eyes 40 serve as foot rests for the occupant of the go-cart.

Figure 8:
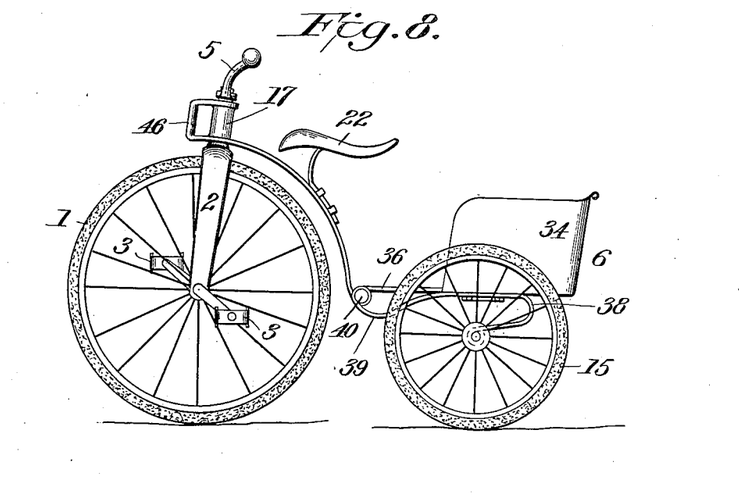
Fig. 8 is an elevation of a vehicle substantially like that shown in Figs. 6 and 7 and showing another form of go-cart handle.
Figure 9:
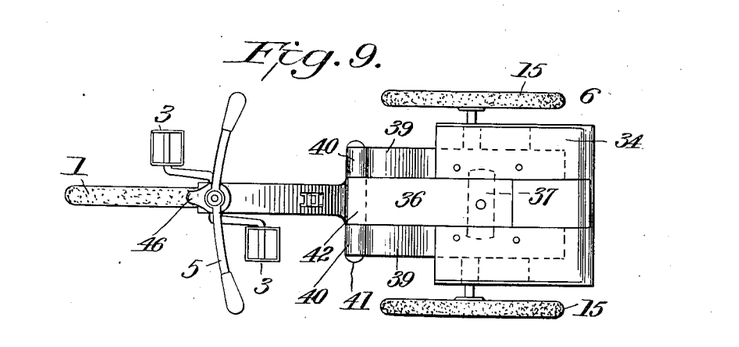
Fig. 9 is a plan view thereof with the saddle removed.

In Figs. 8 and 9, I have shown a vehicle of substantially the same construction as that shown in Figs. 6 and 7, but illustrating a modified form of handle for the go-cart, in which the metal of the backbone at the steering head is bent back upon itself with a rounded connecting hand piece 46 in advance of the steering head 17, the bracket 18 of the other forms being omitted.

Figure 10:
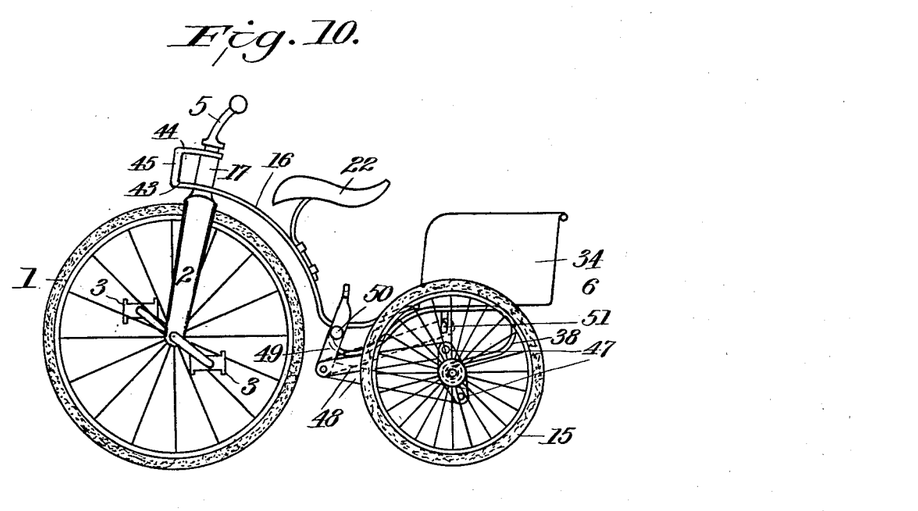
Fig. 10 is an elevation of a vehicle like that shown in Fig. 8, and showing the go-cart provided with a driving mechanism.
Figure 11:
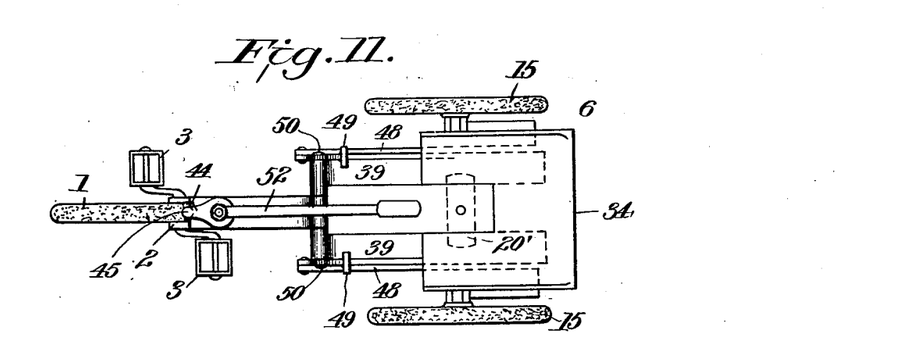
Fig. 11 is a plan view thereof, with the handle bar removed and a steering bar substituted therefor.

In Figs. 10 and 11, I have shown a combination vehicle constructed in accordance with this invention, in which in addition to the power or driving mechanism of the front steering wheel, the go-cart structure or portion of the vehicle is provided with a power or driving mechanism, and as shown in said Figs. 10 and 11, the axles of the supporting wheels of the go-cart are provided with crank members 47 connected by links 48 with pedals 49 pivoted as at 50 to the forward extensions 39 of the go-cart body. By this arrangement, it will be observed that both occupants of the vehicle may apply power to propel the vehicle; but if it be desired to disconnect the driving mechanism of the go-cart so that the vehicle may be propelled solely by the rider of the velocipede, the links 48 may be disconnected from their respective crank members 47 and fastened to hooks or other securing devices 51 depending from the body of the go-cart. Or, if it be desired that the vehicle be propelled solely by the occupant of the go-cart, the driving mechanism thereof is connected with the axles or cranks and a suitable steering handle 52 connected with the steering post of the vehicle so that the occupant may properly guide the machine, and when the vehicle is used only by the occupant of the go-cart the saddle 22 and the handle bar 5 may be removed from the machine, and the steering handle 52 substituted therefor, as shown in Fig. 11.

Figures 12, 13, 15:
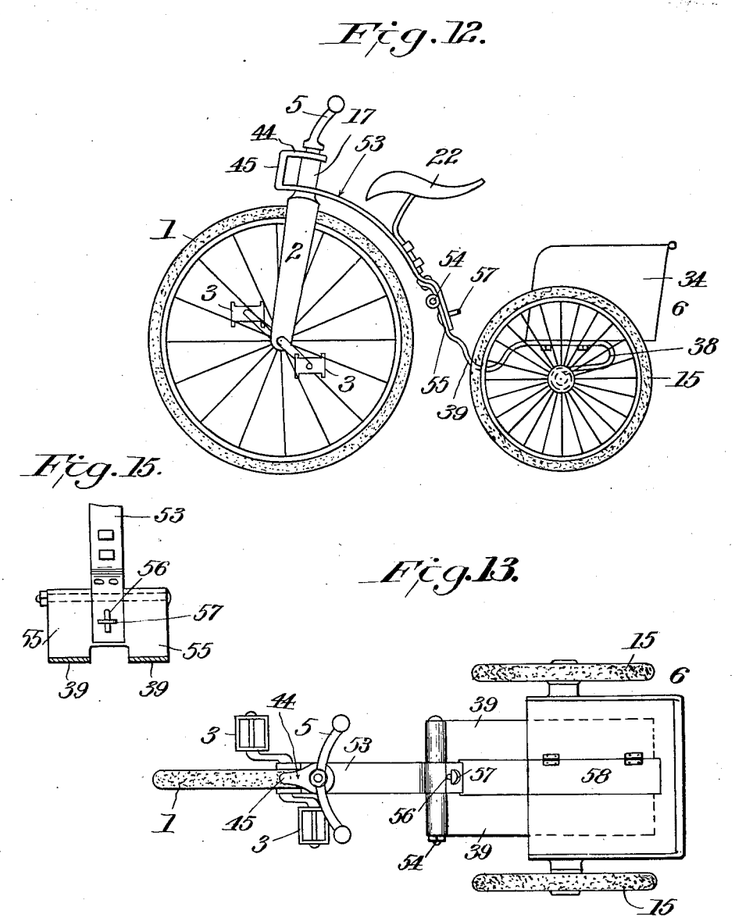
Fig. 12 is an elevation of another form of vehicle embodying the invention and showing a modified form of hinge joint for the backbone, whereby the vehicle may be folded into compact form.
Fig. 13 is a plan view thereof, with the saddle removed.
Fig. 15 is a sectional detail, showing the hinge joint and locking means for the backbone of the vehicle of Fig. 12.

In Figs. 12 and 13, I have shown a modified form of hinged backbone, whereby the folding feature of the vehicle is obtained, and in this form of the device, the rearward extension of the backbone is omitted, and the backbone 53 is hinged at 54 to the forward extensions 39 of the go-cart body and overlaps the upwardly extended end of said forward extensions, and said overlapping end of the backbone is provided with a slot 56 through which passes a turn button 57 (see Fig. 15) for the purpose of locking the parts in operative position, as shown in Fig. 12.

When it is desired to fold the vehicle of Figs. 12 and 13, it is simply necessary to turn the turn button 57 into alinement with the slot 56, when the front wheel of the machine may be turned in under the go-cart, the front wheel passing up into the opening in the bottom of the go-cart to bring the parts of the vehicle into compact form.

As shown in Fig. 13, the bottom of the go-cart body may be provided with a hinged cover plate 58 for filling in the slot or opening in the bottom or seat, and said cover will open upwardly for the passage of the front wheel when the machine is folded.

Figure 14:
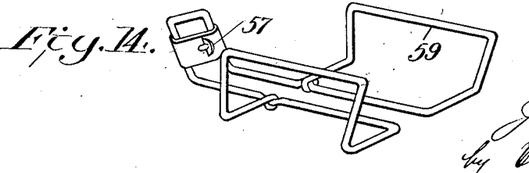
Fig. 14 is a perspective view, showing another form of go-cart frame or body.

In Fig. 14 I have shown a wire body 59, which may be substituted for the sheet metal body of the go-cart shown in Figs. 12 and 13.

Figures 16, 19:
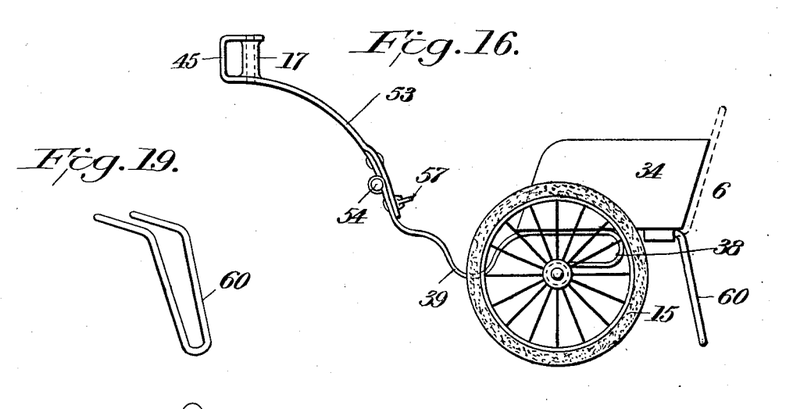
Fig. 16 is a side elevation of a go-cart substantially like that shown in Fig. 12, with the front fork and wheel detached, and provided with a rear prop.
Fig. 19 is a perspective view of the rear prop shown in Fig. 16 detached.

In Fig. 16 I have shown the go-cart of the machine shown in Fig. 12 with the front fork and its attached wheel, the handle bar and the seat removed, so that the go-cart may be used alone, the same being pushed or pulled by grasping the handle 45 in the usual manner. In said Fig. 16 I have also shown the go-cart provided with a rear detachable and reversible prop or brace 60 to prevent the backward tilting of the cart. It will be understood that any and all of the front facing go-carts herein shown may be provided with any suitable prop or brace of this sort to prevent the backward tilting of the cart, when the parts are separated and the go-cart is to be used alone.

Figures 17, 20:
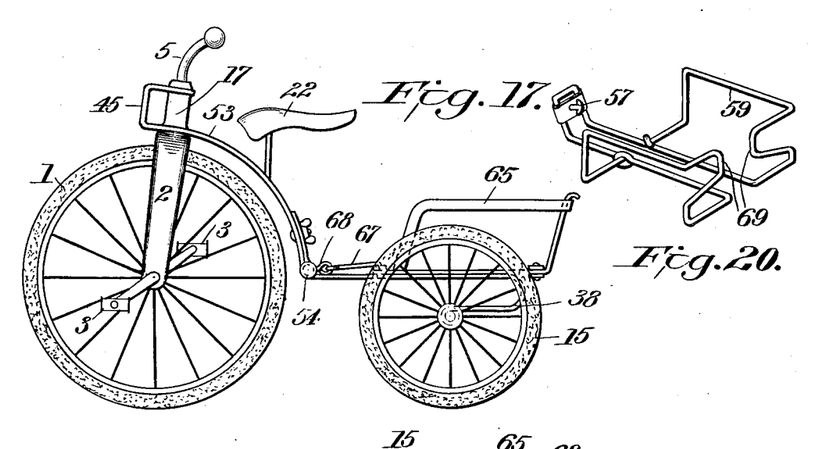
Fig. 17 is a side elevation of another form of vehicle in which the body of the go-cart is laterally collapsible.
Figs. 20 and 21 are perspective views of other forms of go-cart bodies or frames constructed of a single wire and provided with backs.
Figures 18, 21:
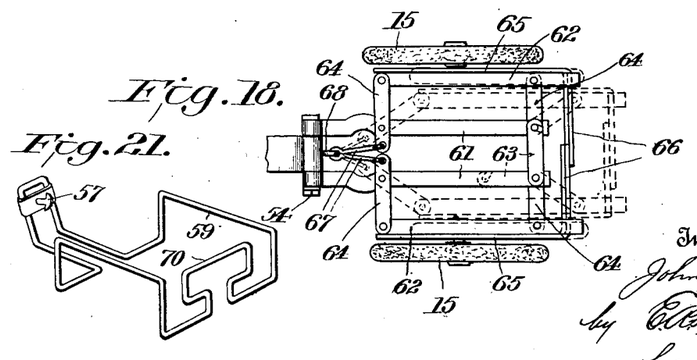
Fig. 18 is a plan view of the go-cart body of Fig. 17, and showing the body collapsed in dotted lines.

In Figs. 17 and 18, I have shown a combined velocipede and go-cart, in which the frame or body of the go-cart is collapsible so that it and the supporting wheels therefor may be folded laterally into compact form, and as shown in said figures, the go-cart frame comprises the inner spaced members 61 and outer parallel members 62, said inner members being connected at their rear ends by a cross bar 63, and their forward ends projecting beyond the front of the body or seat portion and terminating in hinge members to receive the complemental hinge member of the backbone of the vehicle, whereby the members 61 of the go-cart frame are held in spaced relation, to afford clearance space for the front wheel of the vehicle when folded. The inner spaced members 61 and the outer members 62 are connected at front and rear by links 64, and rising from said outer members 62 are the side guards 65, connected at the rear by sliding members 66 to form the back.

The front connecting link members 64 are extended inwardly within the space between the inner members 61 and are connected by means of a link 67 with the extension 68 of the backbone, so that when the front wheel of the machine is folded back and under the body of the go-cart, the link 67 pulls upon the inner ends of the connecting links 64 and thereby collapses the frame of the go-cart, as indicated in dotted lines in Fig. 18, and the wheels of the go-cart being supported upon springs secured to the outer or side members 62, the wheels also will be drawn in laterally in collapsing or folding the vehicle.

In all the forms of the vehicles as above described, the backbone is constructed of broad, flat material and of sufficient width to serve as a mud guard to prevent mud and dirt from being thrown upon the occupants of the vehicle by the front wheel.

In Figs. 20 and 21, I have shown other forms of go-cart bodies constructed of a single piece of wire, substantially like that shown in Fig. 14, but having the wire bent to form backs 69 and 70, respectively, as shown in said Figs. 20 and 21.

Figures 22, 26, 27:
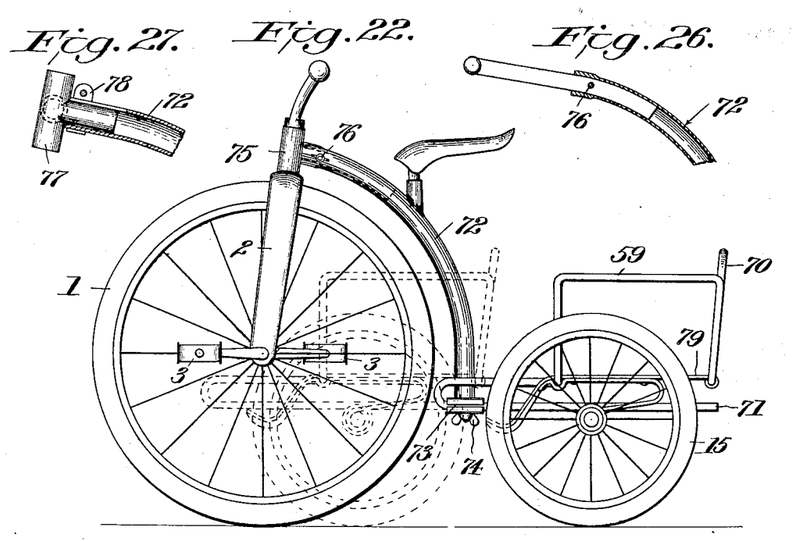
Fig. 22 is a side elevation of another form of vehicle embodying the invention, and showing a sliding connection between the backbone and go-cart body.
Fig. 26 is a sectional detail view of the upper end of the backbone of the vehicle shown in Fig. 22, supplied with a detachable auxiliary handle to be used when the front fork and wheel of the vehicle of Fig. 22 are removed.
Fig. 27 is a sectional detail view of the upper portion of the backbone provided with an adjustable combined steering head and handle.

In Fig. 22, I have shown another form of vehicle embodying the invention, in which the connection between the backbone and the go-cart body is a sliding connection instead of a hinged connection, and in this form of the vehicle, the go-cart body is shown as constructed of wire and of a shape substantially like that in Fig. 21, but instead of the wire being bent upwardly at the front to receive the hinge member of the backbone, the wire is bent backward under the body of the go-cart to form two spaced bars or rods 71 terminating at the rear of the body.

In this form of the vehicle, the backbone 72 is shown as constructed of tubular metal, and at its lower end is provided with a two-part clamp 73 having its edges shaped to fit the bars or rods 71 and adapted to be clamped upon said bars by means of a nut 74.

The forward or upper end of the backbone 72 is adapted to receive a detachable steering head 75, secured in place by a bolt and nut 76, whereby the steering head may be removed and an auxiliary handle, as shown in Fig. 26, substituted therefor, when the front fork and wheel are removed and it is desired to use the go-cart alone. Or, the backbone may be split and provided with a swiveled combined steering head and handle 77, as shown in Fig. 27, adapted to be rigidly held in the split end of the backbone by a clamping ring 78, and capable of being turned to a vertical position when used with the front steering wheel, and turned to a horizontal position, as indicated in dotted lines, to serve as a handle when the front wheel is removed and the go-cart used alone.

Figures 23, 24, 25, 28:
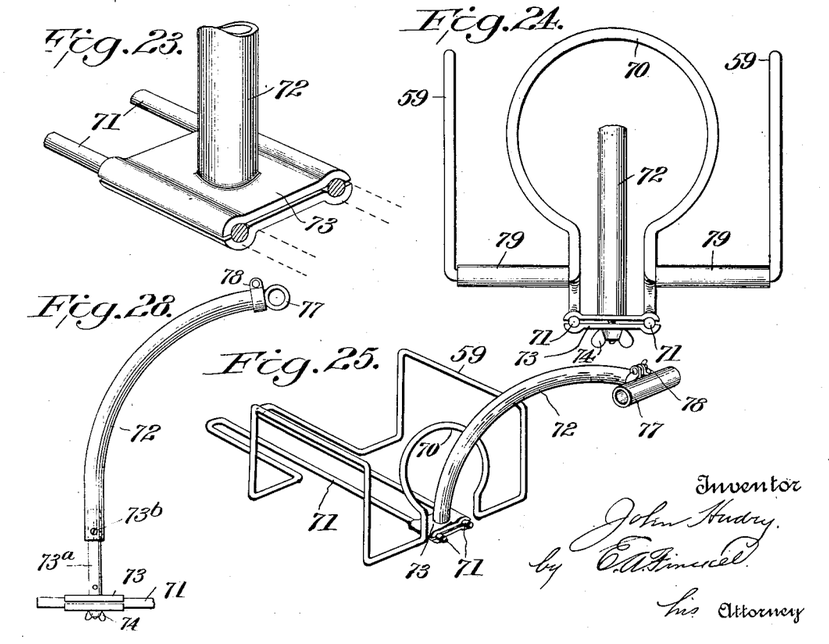
Fig. 23 is a detail perspective view, on a larger scale, of the sliding or adjustable connection between the backbone and go-cart of the vehicle of Fig. 22.
Fig. 24 is a rear view, on a larger scale, of portion of the vehicle of Fig. 22.
Fig. 25 is a perspective view of a modified form of the go-cart body of the vehicle shown in Fig. 22, and showing the backbone reversed.
Fig. 28 is a side elevation, showing a backbone with an extensible connection with the clamping plate.

As shown in Fig. 22 the go-cart is front facing, but if it be desired to use the go-cart as a rear facing vehicle, the clamp 73 may be detached from the rods or bars 71 and the backbone reversed and attached to the bars or rods at the rear of the go-cart, as shown in Fig. 25.

When the vehicle is in the position shown in Fig. 22 and it be desired to fold the vehicle, it is simply necessary to loosen the clamp 73 and slide it rearward upon the rods, until the go-cart assumes the position shown in dotted lines, the front wheel passing in between the spaced rods or bars of the go-cart frame.

Any suitable seat members 79 may be secured to the front and rear bars of the go-cart frame.

In Fig. 25 I have shown a slightly modified form of go-cart frame for the vehicle of Fig. 22 in which the rods or bars 71 are bent inwardly and rearwardly instead of downwardly and rearwardly, as in Figs. 22 and 24.

The operation of the vehicle will be understood from the foregoing and needs no further description. However, it will be understood that any and all of the vehicles shown are capable of being readily separated so that the go-cart may be used alone, and that all of the forms of the vehicle shown are capable of being folded by simply releasing the means for locking the parts in operative position and folding the front wheel backward and under and between the sides of the go-cart frame or body, or by sliding the parts together to bring the front wheel between the sides of the body of the go-cart.

In order to provide for the convenient manipulation of the go-cart by persons of different height, I may provide an extensible backbone, and as one illustration I have shown in Fig. 28, a tubular backbone such as that shown in Fig. 22 having its lower end telescoping upon a post $73^a$ fixed to and rising from the upper member of the clamp 73 and adapted to be held in adjusted positions by a set-screw $73^b$, whereby the backbone may be raised or lowered to bring its handle member in position to suit the height of the person manipulating the vehicle when used as a go-cart.

What I claim is:

1. In a combined velocipede and go-cart, a front steering and driving wheel, a fork in which said wheel is mounted, a steering post on said fork, a go-cart body and supporting wheels therefor, a backbone for connecting said fork and the go-cart body terminating at its forward end in a tubular steering head adapted to engage the steering post on said fork, and means for detachably connecting said steering head with the steering post, whereby the front steering and driving wheel and its fork may be detached from the backbone, and the go-cart used as an ordinary go-cart, the said backbone serving as a handle therefor.

2. In a combined velocipede and go-cart, a front wheel and fork therefor, a go-cart frame, a backbone connected to said fork, and means for slidably connecting said backbone with the go-cart frame.

3. In a combined velocipede and go-cart, a front wheel and fork therefor, a go-cart frame having an open bottom and spaced rods extending along the opening in said bottom, a backbone connected to said fork, and means for slidably connecting said backbone with said rods, whereby the front wheel and go-cart may be adjusted to a folded condition with the front wheel located between the sides of the go-cart.

4. In a combined velocipede and go-cart, a front wheel and fork therefor, a go-cart frame having an open bottom and spaced rods extending along the opening in said bottom, a tubular backbone connected to said fork, and a two-part clamp fixed to the rear end of the backbone and adapted to be detachably and adjustably fitted to said rods, whereby the front wheel and go-cart may be adjusted to a folded condition with the front wheel located between the sides of the go-cart.

5. In a combined velocipede and go-cart, a front wheel and fork therefor, a go-cart frame, a backbone detachably connected at its forward end to said fork, and means for detachably and slidably connecting the rear end of said backbone to the front of said go-cart frame, said backbone adapted to be detached from the go-cart frame and reversed and secured to the rear of said go-cart frame.

6. In a combined velocipede and go-cart, a front wheel and fork therefor, a go-cart, a tubular backbone connecting said front fork and go-cart, and a combined steering head and go-cart handle adjustably mounted in the forward end of said backbone.

7. In a combined velocipede and go-cart, a front wheel and fork therefor, a go-cart, a backbone for connecting said front fork and go-cart, a steering head fitted upon said fork and detachably connected to said backbone, and an auxiliary handle adapted to be connected to said backbone when the front wheel, its fork and steering head are removed therefrom and the go-cart used alone.

8. In a combined velocipede and go-cart, a front wheel and fork therefor, a go-cart frame constructed of a single piece of wire bent to form seat, side and back portions, and spaced rods, and a backbone connected to said front fork and detachably and adjustably engaging the spaced rods of said go-cart frame.

In testimony whereof, I have hereunto set my hand this seventh day of September, 1915.

JOHN HUDRY.

Witnesses:
 GUY N. NEWMAN,
 F. D. BURGESS.